July 12, 1955        R. W. HUGG        2,712,830
FAUCET
Filed Aug. 9, 1952
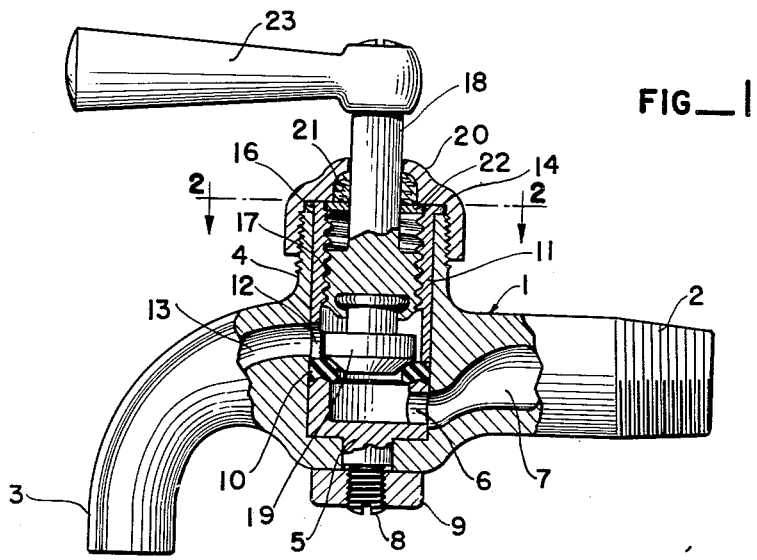
FIG—1
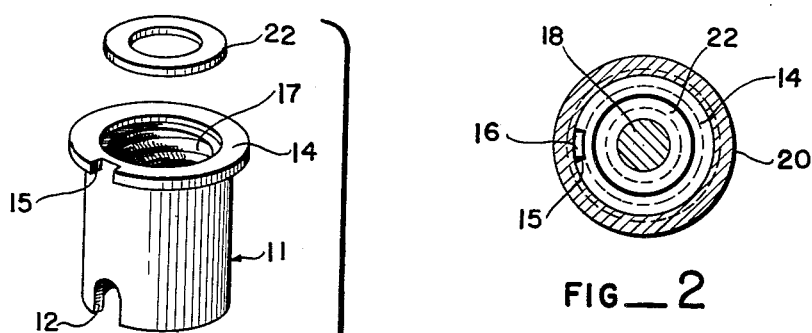
FIG—2
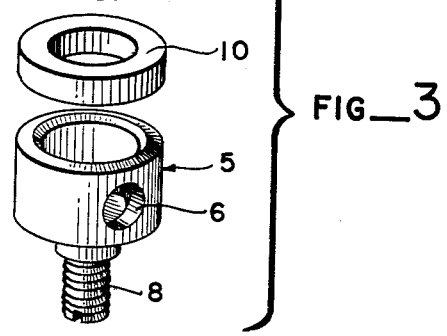
FIG—3
INVENTOR.
RALPH W. HUGG
BY Paul Bliven
ATTORNEY United States Patent Office 2,712,830
Patented July 12, 1955

2,712,830

FAUCET

Ralph Walter Hugg, Kittitas County, Wash.

Application August 9, 1952, Serial No. 303,573

2 Claims. (Cl. 137—613)

The present invention relates to a faucet and, in more particular, to a faucet with a removable valve cage and seat, and a plug cut-off coacting therewith.

Previously, there have been made valves and faucets having removable valve cages, and even faucets having removable cages, in which there is cooperation between a compression valve and a plug cut-off. These constructions are shown in Albrecht, Patent No. 1,635,875, July 12, 1927, and Walter, Patent No. 667,109, January 29, 1901.

However, the prior art devices require a large number of parts and seals while retaining many of the disadvantages of the usual bonnet valve.

The present invention provides a simple removable cage which is sealed by the same gasket used to close off the water. This gasket is held in place by and between the plug cut-off and the cage.

Thus, an object of the present invention is the provision of a faucet or valve having a valve cage sealed by the close-off gasket.

Another object of the present invention is the holding in place of the close-off gasket by and between the valve cage and a plug cut-off.

A further object of the present invention is the use of a single gasket to effect a close-off, a seal for a plug cut-off, and a seal for a valve cage.

A device remedying the above-mentioned defects and achieving these objects is shown in the accompanying drawings, in which:

Fig. 1 is an elevational view, partly in section, showing a faucet embodying the present invention.

Fig. 2 is a section in the line 2—2 of Fig. 1.

Fig. 3 is an exploded view of the valve cage, close-off gasket and plug cut-off.

In Fig. 1, the elevational view, partly in section, of my faucet, there is shown a body 1, having an inlet end 2, a discharge spout 3, and a valve chamber 4. In the bottom of the valve chamber is a plug cut-off 5.

This plug cut-off is in the form of a cup with a port 6 in its side wall. This port may be brought into registry with an inlet passage 7 passing through the inlet end 2. A stem 8 on the plug passes through the body of the faucet. This stem is threaded and the end slotted. A nut 9 is placed on the threaded stem to act as a lock for the plug and to firmly seat the plug. This prevents leakage by the plug. Also, the plug may have the cup sides straight, as shown, or tapered so as to obtain a tighter and more leak-proof fit.

On the rim of the cup is placed a rubber or rubber composition gasket 10. This gasket is in the form of a ring. The gasket is held in place on the cup rim by the lower edge of a valve cage 11. The lower edge of the cage has a notch 12, or port, which communicates with an outlet passage 13 passing through the spout 3. The top of the cage 11 is flanged and this flange 14 rests on the top edge of the valve chamber 4. An aligning notch 15 is formed in the flange 14 and a complementary lug 16 is formed in the top edge of the valve chamber to effect proper registry of the valve cage. The inside of the cage has formed therein screw threads 17 and cooperating therewith are the threads of a valve stem 18. Secured to the lower end of the valve stem is a valve head 19. This head is loosely retained in the stem and its face tapered and machined to make a good seat with the gasket 10.

The plug cut-off, the gasket, and the valve cage are held in place in the chamber by means of a cap 20 that screws on the upper end of the chamber. This cap has an aperture for the valve stem 18. Around the valve stem and placed inside of the cap is a packing 21. The packing is compressed against a washer 22 supported in the upper end of the cage. Compression of the packing is had by the screwing-down of the cap 20.

A handle 23 is provided for the operation of the valve stem 18.

In the assembly of the faucet herein shown and described, the plug cut-off cup 5 is inserted in the chamber 4 with the stem 8 protruding through the bottom of the chamber. Next, the gasket 10 is placed on the lip of the cup. Then the valve cage is inserted in the chamber with the port 12 in registry with the outlet 10. The valve stem 18 is then inserted and screwed partly down. The packing retaining washer 22, the cap 20, and the packing 21 are next put in place around the stem 18 and the cap screwed down to seat the cage on the gasket 10 and to compress the packing 21. The handle 23 may then be placed on the valve stem and the stem turned to bring the valve head 19 into closing engagement with the gasket 10. The faucet is now ready for use. However, if fluid or liquid is to flow, the port 6 in the plug 5 must be in alignment with the inlet passage 7. The alignment, or registry, is had by inserting a blade in the slot in the end of the plug stem 8 and adjusting the plug. The nut 9 may then be tightened on the stem 8 to firmly seal and lock the plug.

If the plug is turned so that its port is out of registry with the inlet passage, flow through the faucet will be cut off. In this condition and with the nut 9 locking the plug, the cap 20 may be removed, the valve cage and gasket extracted from the valve chamber 4 and a new gasket inserted. The valve may then be reassembled. This last adjustment may be made without shutting off the supply of fluid to the faucet.

Having thus described my invention, I claim:

1. A faucet, comprising: a body having formed therein inlet and outlet passageways, a valve chamber connecting said passageways, seated in said chamber a cup-shaped plug cut-off having formed in the skirt thereof a port adapted to be brought in and out of registry with said inlet passage; a gasket resting on the rim of said cup and having its edge in contact with the inner wall of said chamber, a valve cage fitting in said chamber and having its lower edge seating on said gasket, said cage formed with a port in registry with said outlet passage, a valve stem in said cage, coacting threads between said stem and cage, on said stem a head seating on said gasket, and a cap around said stem, retaining said cage in said chamber and forcing said cage upon said gasket.

2. A faucet, comprising: a valve chamber having formed therein an inlet opening and an outlet opening; a cup-shaped plug cut-off formed with an inlet opening in the side thereof, and the open end of said cup forming an outlet therefor, said plug being retained in said chamber and adapted upon movement therein to bring said inlet openings into and out of registry; an open-ended valve cage formed with an outlet opening in the side thereof adapted to be placed in registry with said chamber outlet opening, and one of the open ends of said cage forming an inlet opening therefor; a valve stem and head in said cage; and an annular gasket retained between the inlet end of said cage, the outlet end of said plug, and the inner wall of said chamber; and said gasket being engageable by said valve head to control the passage of fluid through said chamber.

References Cited in the file of this patent

UNITED STATES PATENTS

| | | |
|---|---|---|
| 274,364 | Oldendorf | Mar. 20, 1883 |
| 627,473 | Boyer | June 27, 1899 |
| 667,109 | Walter | Jan. 29, 1901 |
| 914,069 | Peilehe | Mar. 2, 1909 |
| 1,350,040 | Shackleford | Aug. 17, 1920 |
| 1,431,701 | Sklaska | Oct. 10, 1922 |
| 1,635,123 | Herman | June 5, 1927 |
| 1,635,875 | Albrecht | July 12, 1927 |
| 2,123,477 | Sheedy | July 12, 1938 |
| 2,388,710 | Sanford | Nov. 13, 1945 |

FOREIGN PATENTS

| | | |
|---|---|---|
| 4,337 | Great Britain | 1884 |
| 5,611 | Switzerland | 1892 |
| 99,111 | Switzerland | 1923 |